US012227023B2

(12) United States Patent
Wang

(10) Patent No.: US 12,227,023 B2
(45) Date of Patent: Feb. 18, 2025

(54) KNOCK TYPE DIRECT LIQUID PEN REFILL ASSEMBLY AND WRITING PEN

(71) Applicant: QINGDAO BEST POINT STATIONERY CO., LTD., Qingdao (CN)

(72) Inventor: Yuanhong Wang, Hangzhou (CN)

(73) Assignee: QINGDAO BEST POINT STATIONERY CO., LTD., Qingdao (CN)

( * ) Notice: Subject to any disclaimer, the term of this patent is extended or adjusted under 35 U.S.C. 154(b) by 0 days.

(21) Appl. No.: 18/025,391

(22) PCT Filed: Aug. 17, 2021

(86) PCT No.: PCT/CN2021/112993
§ 371 (c)(1),
(2) Date: Mar. 8, 2023

(87) PCT Pub. No.: WO2022/052753
PCT Pub. Date: Mar. 17, 2022

(65) Prior Publication Data

US 2023/0339254 A1 Oct. 26, 2023

(30) Foreign Application Priority Data

Sep. 9, 2020 (CN) ........................ 202010941079.3

(51) Int. Cl.
*B43K 7/10* (2006.01)
*B43K 1/08* (2006.01)
*B43K 11/00* (2006.01)

(52) U.S. Cl.
CPC ................ *B43K 7/10* (2013.01); *B43K 1/082* (2013.01); *B43K 11/00* (2013.01)

(58) Field of Classification Search
CPC .......... B43K 1/086; B43K 1/088; B43K 7/10; B43K 7/105
See application file for complete search history.

(56) References Cited

U.S. PATENT DOCUMENTS 853,156 A * 5/1907 Brenton ................ B43K 1/086
401/214
4,522,525 A * 6/1985 Saito ........................ B43K 8/18
401/258
(Continued)

FOREIGN PATENT DOCUMENTS

CN 1547530 11/2004
CN 101786395 7/2010
(Continued)

OTHER PUBLICATIONS

JP2017105161A (Year: 2017).*

*Primary Examiner* — David P Angwin
*Assistant Examiner* — Bradley S Oliver
(74) *Attorney, Agent, or Firm* — Jiwen Chen; Joywin IP Law PLLC

(57) ABSTRACT

Disclosed are a knock type direct liquid pen refill assembly and a writing pen. The pen refill assembly comprises an ink cylinder assembly (100), a pen tip (200) and an elastic member (300). An ink guide core (150) is provided in the ink cylinder assembly. The pen tip (200) is arranged at one end of the ink cylinder assembly (100). An ink duct (210) is formed inside and passes through the pen tip (200). A ball member (230) is provided at an ink outlet end of the ink duct (210). The ink guide core (150) partially passes through the ink duct (210), and one end of the ink guide core (150) is abutted against the ball member (230). The elastic member (300) is sleeved at the periphery of the ink guide core (150) and positioned inside the ink duct (210). The elastic member is abutted against the ball member to exert a force, such that
(Continued)

the ball member is closely attached to an inner wall of the ink outlet end, the ball member forms sealed contact with the inner wall of the ink outlet, and ink volatilization and leakage are avoided.

3 Claims, 8 Drawing Sheets

(56) References Cited

U.S. PATENT DOCUMENTS

| | | | | | |
|---|---|---|---|---|---|
| 4,603,994 | A * | 8/1986 | Mitsuda | B43K 1/08 401/199 |
| 4,795,286 | A * | 1/1989 | Shimoishi | B43K 1/08 401/209 |
| 4,938,620 | A * | 7/1990 | Weiss | B43K 8/18 401/219 |
| 6,340,262 | B1 * | 1/2002 | Komiya | B43K 8/04 401/199 |
| 6,398,442 | B1 * | 6/2002 | Furukawa | B43K 7/10 401/241 |
| 6,554,521 | B1 * | 4/2003 | Kobayashi | B43K 1/08 401/214 |
| 6,755,587 | B2 * | 6/2004 | Fukushima | B43K 7/10 401/214 |
| 7,037,015 | B1 * | 5/2006 | Witz | B43K 1/08 401/209 |
| 7,938,592 | B2 * | 5/2011 | Tamano | B43K 7/10 401/241 |
| 9,545,813 | B2 * | 1/2017 | Fukumoto | B43K 24/023 |
| 9,889,701 | B2 * | 2/2018 | Fukumoto | B43K 8/00 |
| 2001/0012468 | A1 | 8/2001 | Furukawa et al. | |

FOREIGN PATENT DOCUMENTS

| | | | |
|---|---|---|---|
| CN | 109318620 | 2/2019 | |
| JP | 08276692 | 10/1996 | |
| JP | 2007313723 | 12/2007 | |
| JP | 2017105161 A * | 6/2017 | B43K 1/082 |

* cited by examiner

KNOCK TYPE DIRECT LIQUID PEN REFILL ASSEMBLY AND WRITING PEN

This is a U.S. national stage application of PCT Application No. PCT/CN2021/112993 under 35 U.S.C. 371, filed Aug. 17, 2021 in Chinese, claiming priority of Chinese Application No. 202010941079.3, filed Sep. 9, 2020, all of which are hereby incorporated by reference.

TECHNICAL FIELD

The present invention relates to the technical field of stationery, and in particular, to a knock type direct liquid pen refill assembly and a writing pen.

BACKGROUND TECHNOLOGY

Compared with gel pen, traditional direct liquid water-based ballpoint pen has the advantages of long last writing life (3-5 times that of ordinary gel), uniform inking and smooth hand feeling, but the water-based ink used is easy to volatilize and dry up, so the traditional direct liquid water-based ballpoint pen are designed with a pull-up cap. Still, there are problems that the pen cap is easy to lose, or improper sealing by the cap is likely to lead to dry-up or leakage of ink. The knock type direct liquid water-based ballpoint pen with a click-top instead of a cap could solve the above-mentioned problems.

Chinese patent CN200780033045.7 discloses a writing tool which is a knock type direct liquid pen, wherein an internal ink guide core is provided with a plurality of several pieces, an internal spring acts on the internal ink guide core to push the internal ink guide core further to abut against a writing ball of a pen tip; with these arrangements, the problems of drying up or leakage of ink by the seal between the writing ball and the pen tip could be solved. However, its disadvantage is that improper assembly or poor quality control of the ink guide core may reduce the force exerted by the spring, resulting in insufficient sealing force of the writing ball. In other words, the wear of the ink guide core or any processing or assembly error may cause the ink guide core to press against the side of the writing ball under the action of the spring and the sealing force formed between the writing ball and the inner edge of the pen would be skewed, and further resulting in seal failure and drying up or leakage of ink.

The above information disclosed therein is only for a better understanding of the background of the present invention and therefore it may contain information that it does not constitute prior art that is already known to a person of ordinary skill in the art.

SUMMARY OF INVENTION

In view of the problems mentioned in the background, the present invention provides a knock type direct liquid pen refill assembly and a writing pen. The refill assembly directly applies a force to a ball member through an elastic member so that the ball member could be pressed up against the inner wall of an ink outlet end to form a contact seal to avoid dry up and leak of ink.

In order to realize the above-mentioned purpose of the invention, the present invention adopts the following technical scheme for realization.

One aspect of the present invention provides a knock type direct liquid pen refill assembly comprising: an ink cartridge assembly provided with an ink guide core therein;

a pen tip disposed at one end of the ink cartridge assembly, in which an ink duct is formed and passes therethrough, a ball member is provided at an ink outlet end of the ink duct, the ink guide core is partially inserted into the ink duct and one end of the ink guide core abuts against the ball member; and an elastic member wrapped around the outer periphery of the ink guide core and positioned inside the ink duct, and the elastic member abuts against the ball member to exert a force to push the ball member up against the inner wall of the ink outlet end.

In some embodiments of the present invention, the elastic member is a conical spring and one end of the conical spring gradually tapers in diameter toward the ball member.

In some embodiments of the present invention, the ink guide core comprises an ink guide core upper portion and an ink guide core lower portion which are integrally formed, and the diameter of the ink guide core upper portion is larger than that of the ink guide core lower portion, and a stepped portion is formed between the ink guide core upper portion and the ink guide core lower portion, one end of the conical spring abuts against the ball member and the other end of the conical spring abuts against the stepped portion.

In some embodiments of the present invention, the ball member is a bead; one end of the conical spring is pressed up against the bead and one end of the ink guide core is abutted against the bead.

In some embodiments of the present invention, the ball member comprises an upper ball and a lower ball, wherein the upper ball abuts against the lower ball, the conical spring abuts against the upper ball and the ink guide core abuts against the upper ball.

In some embodiments of the present invention, the ink cartridge assembly comprises an ink cartridge, a regulator, a first connecting member and a second connecting member, in which the regulator is disposed in the ink cartridge, a first through hole is formed inside the regulator; the first connecting member comprises a hollow straight cylindrical portion having an outer lateral surface provided with a first convex ring portion along a circumferential direction thereof, the ink cartridge is sleeved on the outer lateral surface of the straight cylindrical portion, one end of the ink cartridge abuts against the first convex ring portion and one end of the regulator is inserted into the first connecting member;

a second through hole is formed inside the second connecting member, and the outer lateral surface of the second connecting member is provided with a second convex ring portion and a third convex ring portion along a circumferential direction thereof; one end of the second connecting member is inserted into the first through hole and one end of the regulator abuts against the second convex ring portion and one end of the first connecting member abuts against the third convex ring portion;

one end of the pen tip is inserted into the second through hole; and the first through hole, the second through hole and the ink duct are coaxial and communication with each other, and the ink guide core penetrates through the first through hole, the second through hole and the ink duct.

In some embodiments of the present invention, a vent is opened on the first connecting member or the second connecting member.

In some embodiments of the present invention, the outer peripheral wall of the straight cylindrical portion of the first connecting member is provided with ventilation grooves along its circumferential direction.

In some embodiments of the present invention, one or more first protruding portions are provided on an inner peripheral wall of the ink duct; the first protruding portions are pressed up against the ink guide core; one or more second protruding portions are disposed on an inner peripheral wall of the second through hole; the second protruding portions are abutted against the ink guide core; the upper end of the ink guide core is in an interference fit with the first through hole.

Another aspect of the present invention provides a writing pen comprising the knock type direct liquid pen refill assembly as mentioned above.

Compared with the prior art, the advantages and positive effects of the present invention are:

In the knock type direct liquid pen refill assembly disclosed in the present invention, the elastic member directly exerts force on the ball member so that the ball member could abut against the inner wall of the ink outlet end, and the ball member and the inner wall of the ink outlet end form a contact seal to prevent ink volatilization and ink leakage. The elastic part acts directly on the ball part, the sealing effect of the ball member is not affected by the processing or assembly deviation of other components such as the ink guide core, and the sealing effect is better and more reliable.

Other features and advantages of the present invention will become more apparent after reading the detailed description of the present invention in conjunction with the accompanying drawings.

BRIEF DESCRIPTION OF DRAWINGS

In order to more clearly illustrate the embodiments of the present invention or the technical solutions in the prior art, the following briefly introduces the accompanying drawings that need to be used in the description of the embodiments or the prior art. Obviously, the accompanying drawings in the following description are a part of embodiments of the present invention, and for those of ordinary skill in the art, other drawings can also be obtained from these drawings without any creative effort.

REFERENCE NUMBER

Figure 1:
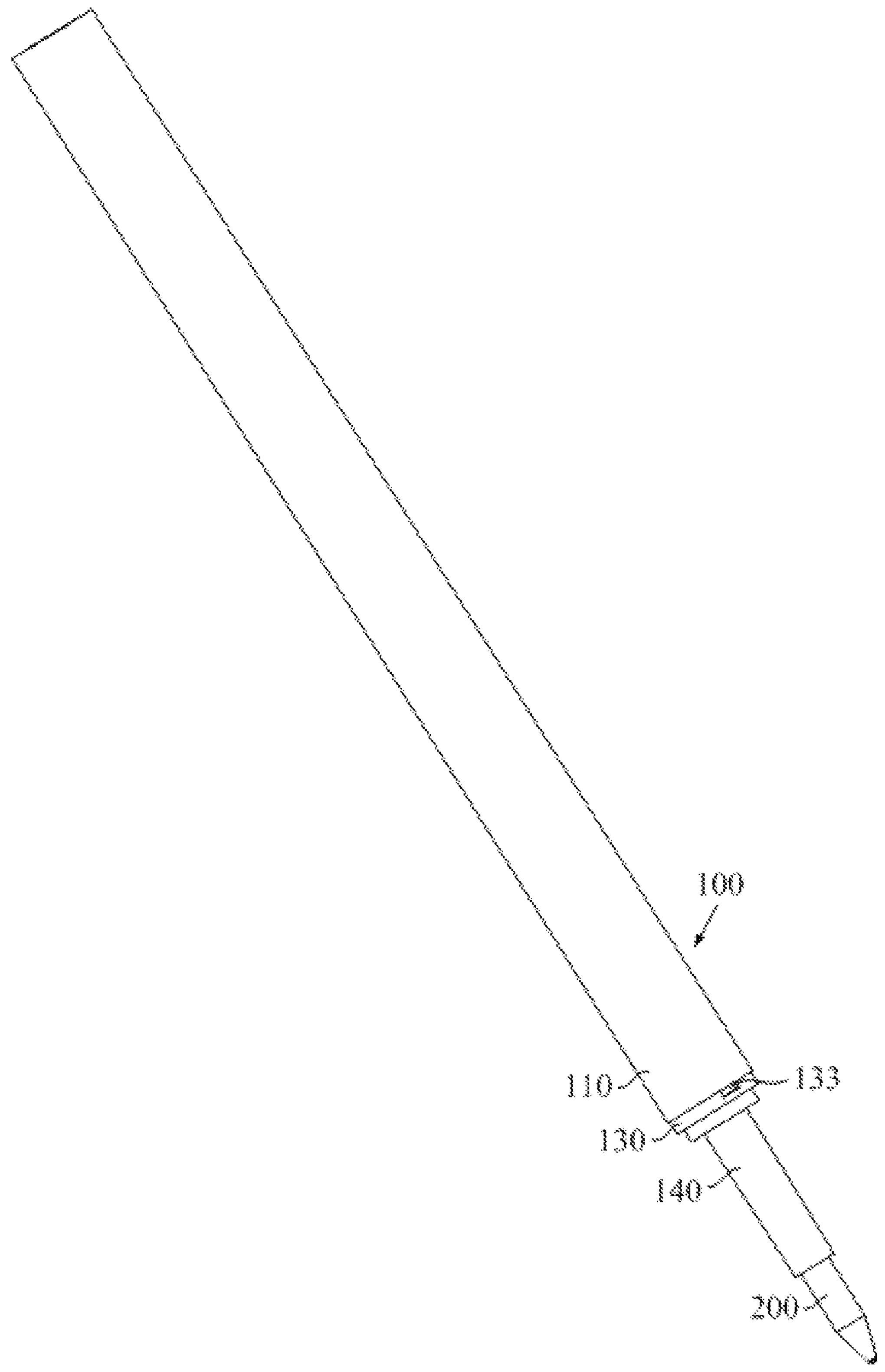
FIG. 1 is a schematic structural diagram of a knock type direct liquid pen refill assembly according to an embodiment of the present invention.

100—ink cartridge assembly, 110—ink cartridge, 120—regulator, 121—first through hole, 130—first connecting member, 131—straight cylindrical portion, 132—first convex ring portion, 133—vent, 134—ventilation grooves, 140—second connecting member, 141—second through hole, 142—second convex ring portion, 143—third convex ring portion, 144—second protruding portion, 150—ink guide core, 151—ink guide core upper portion, 152—ink guide core lower portion, 153—stepped portion;

200—pen tip, 210—ink duct, 211—ink outlet end, 220—first protruding portion, 230—ball member, 231—upper ball, 232—lower ball;

300—elastic member, 310—conical spring.

DETAILED DESCRIPTION OF THE EMBODIMENTS

In order to make clearer the purposes, technical solutions and advantages of the embodiments of the present invention clearer, technical solutions disclosed in embodiments of the present invention will be clearly and completely described below with reference to the accompanying drawings. Obviously, the described embodiments are only a part of the embodiments of the present invention, but not all embodiments. Based on the embodiments of the present invention, all other embodiments that can be obtained by those skilled in the art without creative effort are to be considered within the scope of protection of the present invention.

It should be noted that, in the description of the present invention, the terms "up", "down", "left", "right", "vertical", "horizontal", "inner", "outer", etc., indicate directions or positions The terminology of the relationship is based on the directional or positional relationship shown in the drawings, which is for the convenience of description only, and does not indicate or imply that the device or element must have a particular orientation, be constructed and operated in a particular orientation, and therefore should not be construed as limitations of the present invention. In addition, the terms "first" and "second" are used for descriptive purposes only and should not be construed to indicate or imply relative importance.

Embodiment 1

Figure 2:
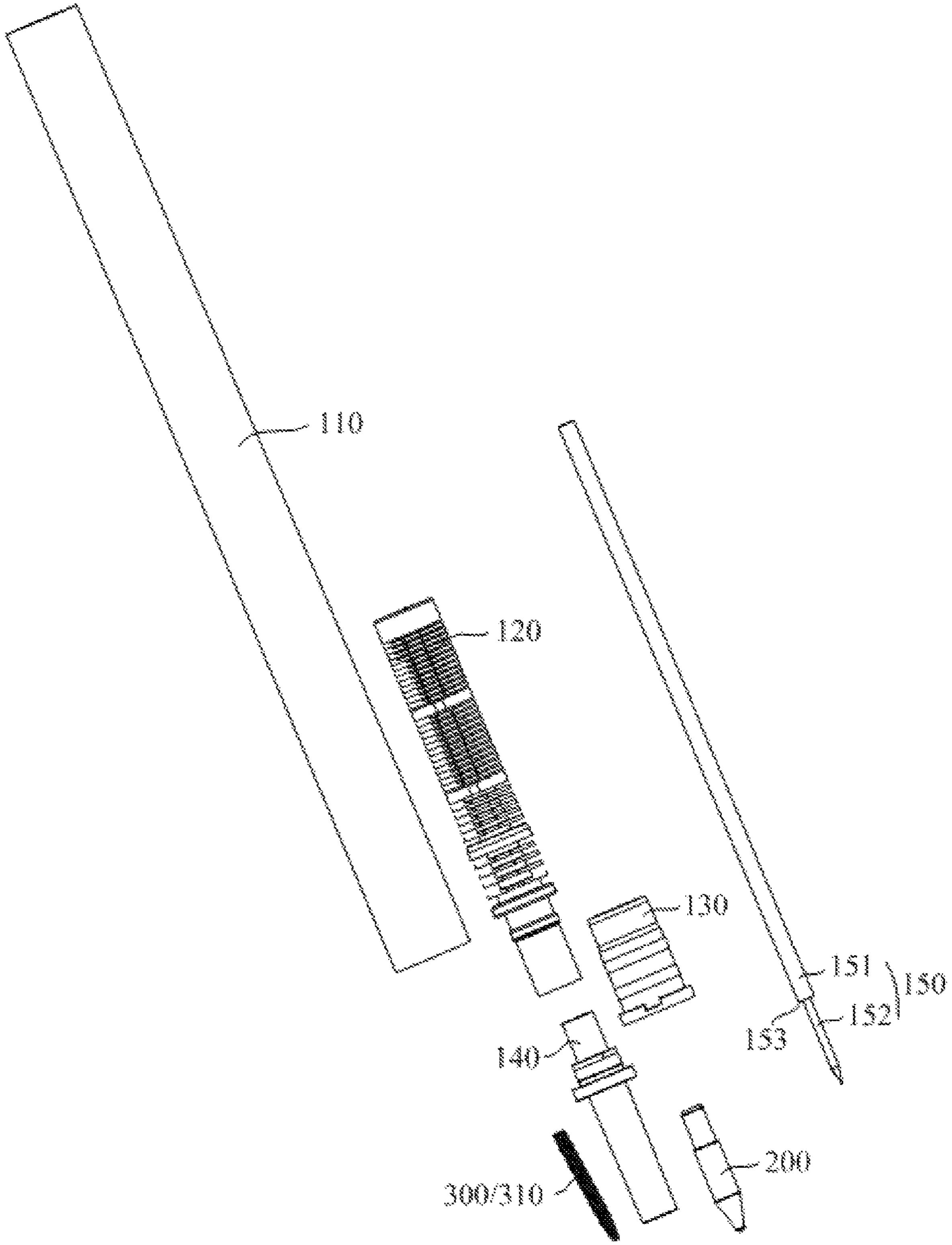
FIG. 2 is an exploded view of a knock type direct liquid pen refill assembly according to an embodiment of the present invention.
Figure 3:
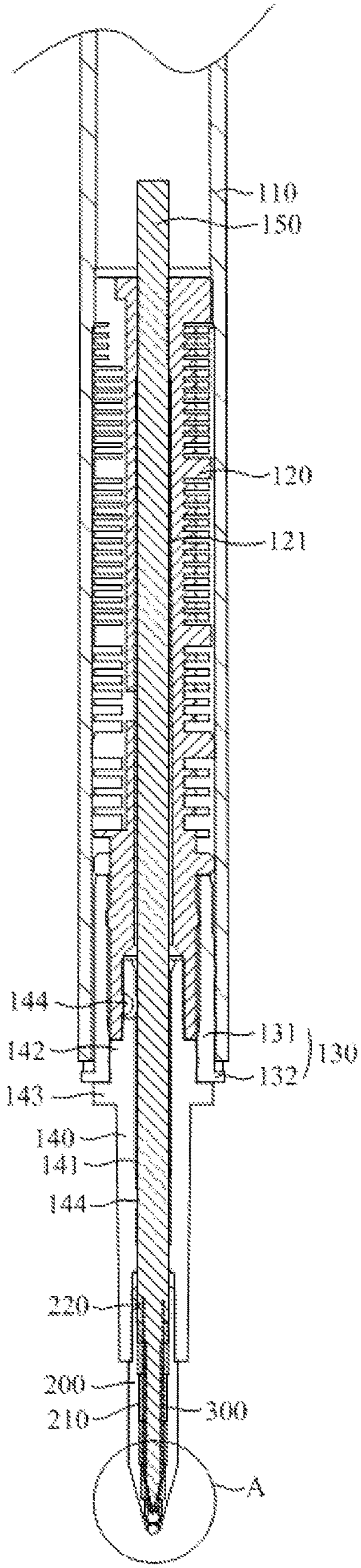
FIG. 3 is a cross-sectional view of a knock type direct liquid pen refill assembly according to an embodiment of the present invention.

Referring to FIG. 1 to FIG. 3, a knock type direct liquid pen refill assembly according to an embodiment of the present invention comprises an ink cartridge assembly 100, a pen tip 200, an elastic member 300 and other parts.

The ink cartridge assembly 100 is provided with an ink guide core 150 therein. The ink cartridge assembly 100 is used to store, guide, and feed ink to the pen tip 200 for writing.

The pen tip 200 is disposed at one end of the ink cartridge assembly 100. An ink duct 210 is formed inside the pen tip 200 and passes through the ink duct 210. A ball member 230 is provided at an ink outlet end 211 of the ink duct 210. The ink guide core 150 is partially inserted into the ink duct 210, and one end of the ink guide core 150 is pressed against the ball member 230. The ink is guided from the ink cartridge assembly 100 to the ink duct 210 and finally reaches to the ball member 230, and the shearing and rolling of the ball member 230 could achieve a smooth ink supply.

Figure 4:
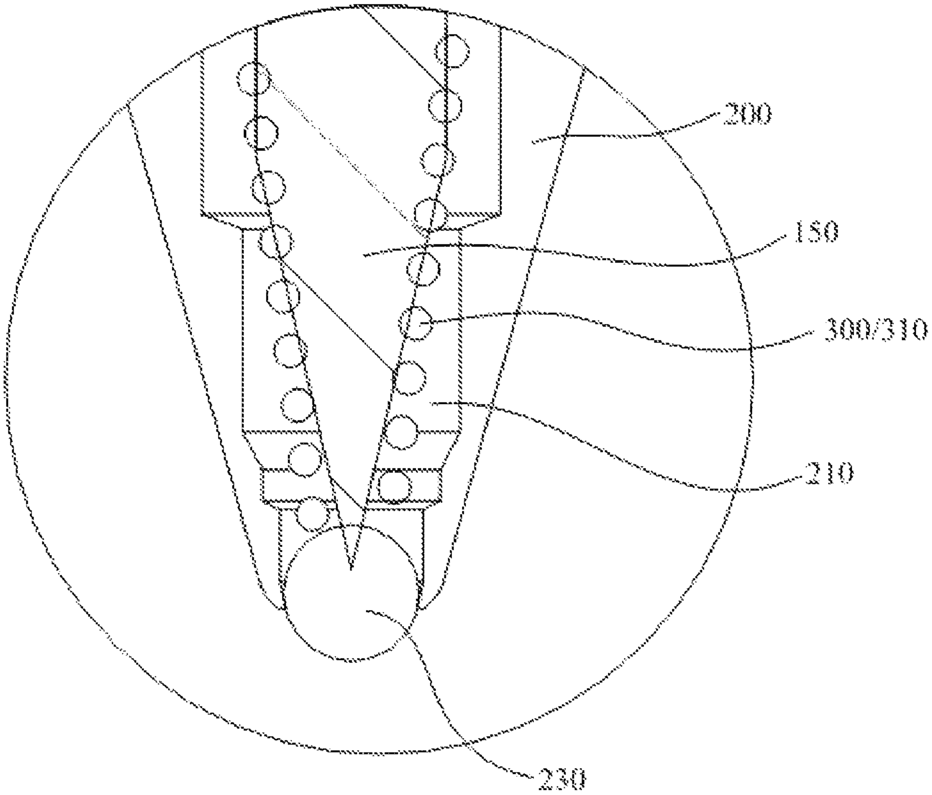
FIG. 4 is an enlarged view of a part A shown in FIG. 3.

Referring to FIG. 4, the elastic member 300 is wrapped around the outer periphery of the ink guide core 150 and positioned inside the ink duct 210. The elastic member 300 abuts against the ball member 230 to exert a force to push up the ball member 230 against the inner wall of the ink outlet end 211.

With the arrangement that the elastic member 300 directly exerts a force on the ball member 230 to press up the ball member 230 against the inner wall of the ink outlet end 211, a contact seal is formed between the ball member 230 and the inner wall of the ink outlet end 211 to prevent drying up or leakage of ink.

With the arrangement of the elastic member 300 acting directly on the ball member 230, a sealing quality of the ball member 230 that is not affected by processing or assembly errors and is more reliable could be ensured.

In an embodiment of the present invention, referring to FIG. 2, the elastic member 300 is a conical spring 310, and one end of the conical spring 310 gradually tapers in diameter toward the ball member 230, in which it is convenient that an upper section having a larger diameter could be sleeved on the ink guide core 150 while a lower section having a smaller diameter could abut against the ball member 230, which means that the problem that the diameter of the end of the conical spring 310 is too large to affect the reliability of the fit with the ball member 230 could be avoided.

In an embodiment of the present invention, the ink guide core 150 comprises an ink guide core upper portion 151 and an ink guide core lower portion 152 which are integrally formed, wherein the diameter of the ink guide core upper portion 151 is larger than that of the ink guide core lower portion 152, and a stepped portion 153 is formed between the ink guide core upper portion 151 and the ink guide core lower portion 152. One end of the conical spring 310 abuts against the ball member 230 and the other end of the conical spring 310 abuts against the stepped portion 153.

The integrated ink guide core 150 is simple in structure and easy to assemble, and the stepped portion 153 confines the conical spring 310 in the ink duct 210 to increase the reliability of the fit between the conical spring 310 and the ball member 230.

The material of the ink guide core 150 could be selected from, but is not limited to, polymethylmethacrylate fiber, polyester fiber, nylon fiber, POM microporous material, and composites of any of the above fibers.

According to an embodiment of the present invention, the ball member 230 is a bead. Referring to FIG. 4, one end of the conical spring 310 is pressed up against the bead, and one end of the ink guide core 150 is abutted against the bead.

The end shape of the conical spring 310 is annular, and the annular end acts on the bead, so that the force is uniformly applied to the bead along a circumferential direction and the contact seal between the bead and the inner wall of the ink duct 210 is more reliable.

According to embodiments of the present invention referring to FIG. 1 to FIG. 3, the ink cartridge assembly 100 comprises an ink cartridge 110, a regulator 120, a first connecting member 30, and a second connecting member 140.

The ink cartridge 110 is a hollow cylinder for storing ink, and one end of the ink cartridge 110 is open to facilitate installation of other components.

The regulator 120 is disposed in the ink cartridge 110. The regulator 120 serves to guide ink, divert ink, and temporarily store ink. The specific structure of the regulator 120 is not a main point of the present invention and will not be described in detail. A first through hole 121 is formed inside the regulator 120.

Figure 6:
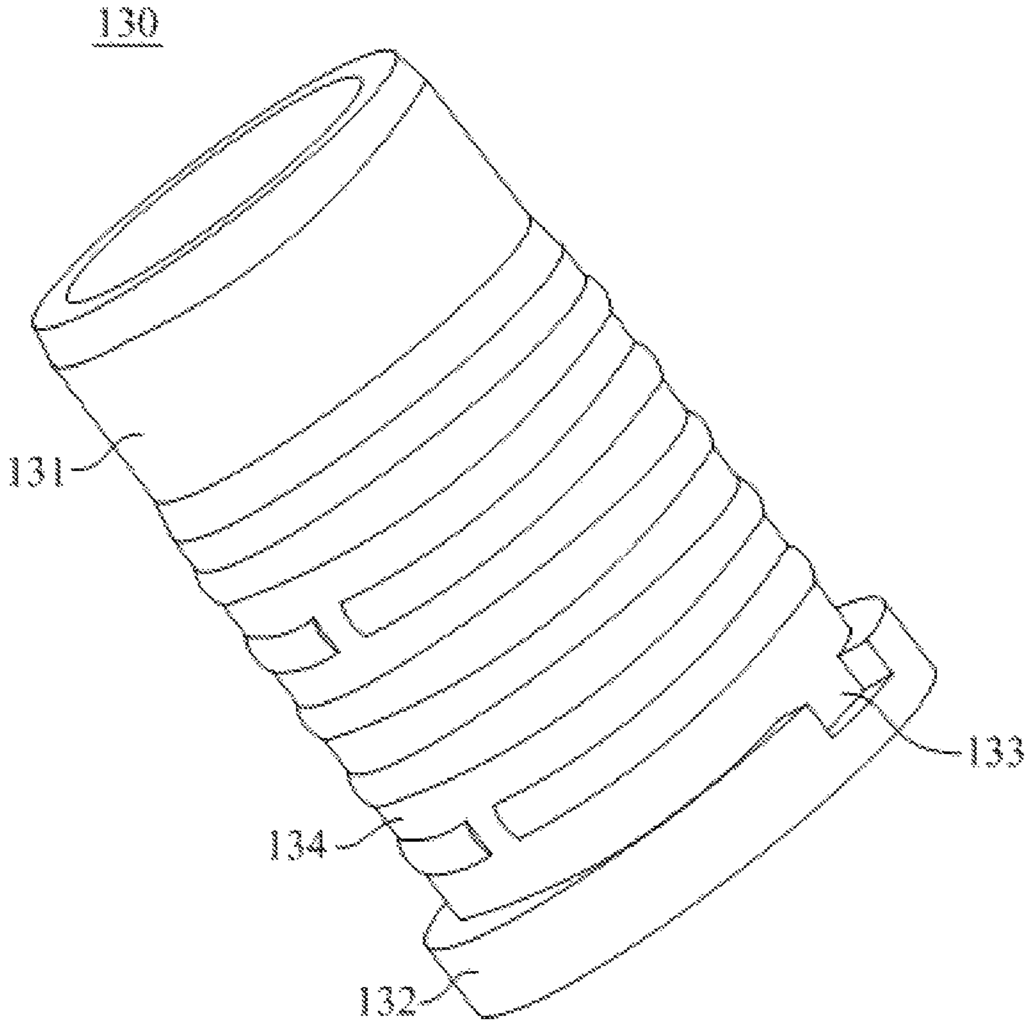
FIG. 6 is a schematic structural diagram of a first connector according to an embodiment of the present invention.

Referring to FIG. 6, the first connecting member 130 comprises a hollow straight cylindrical portion 131 having an outer lateral surface provided with a first convex ring portion 132 along a circumferential direction thereof. The ink cartridge 110 is sleeved on the outer lateral surface of the straight cylindrical portion 131, one end of the ink cartridge 110 abuts against the first convex ring portion 132 and one end of the regulator 120 is inserted into the first connecting member 130.

Figure 7:
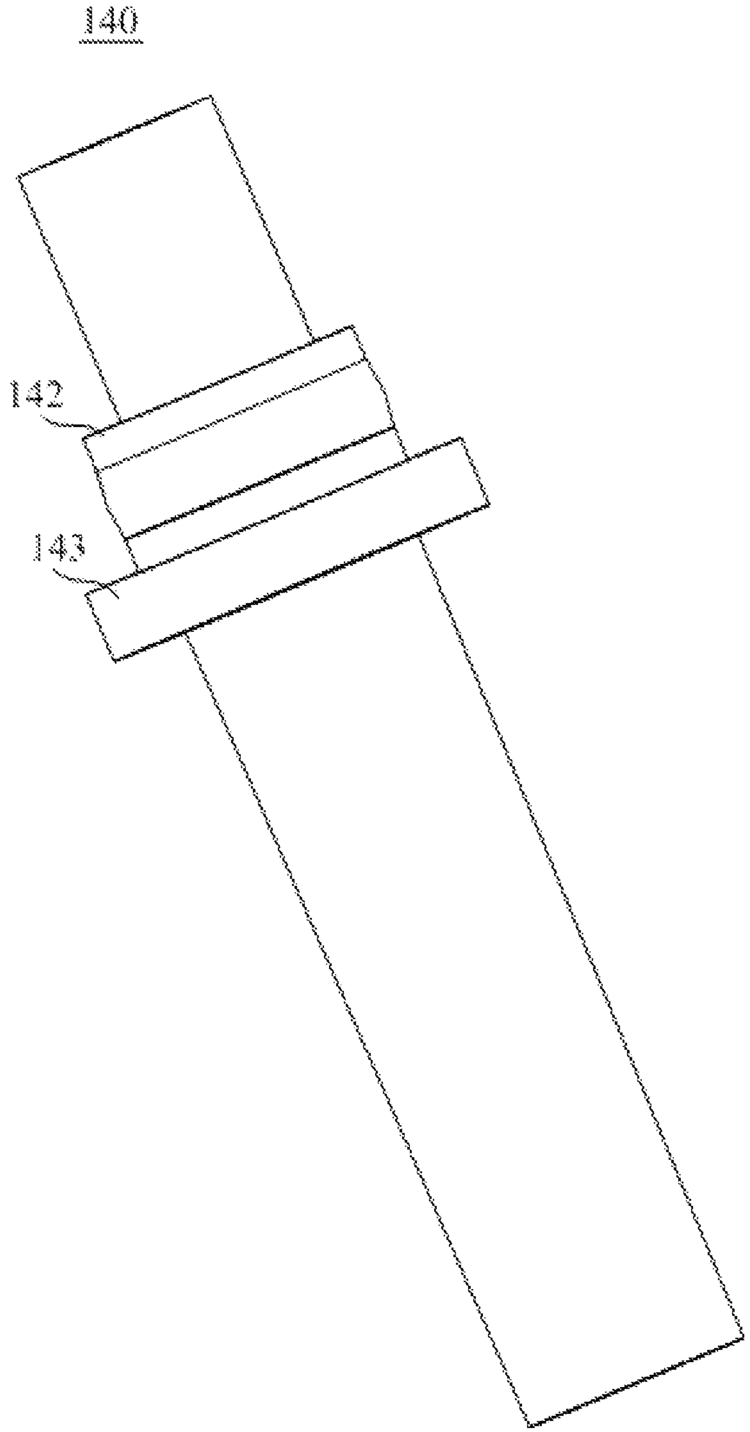
FIG. 7 is a schematic structural diagram of a second connector according to an embodiment of the present invention.
Figure 8:
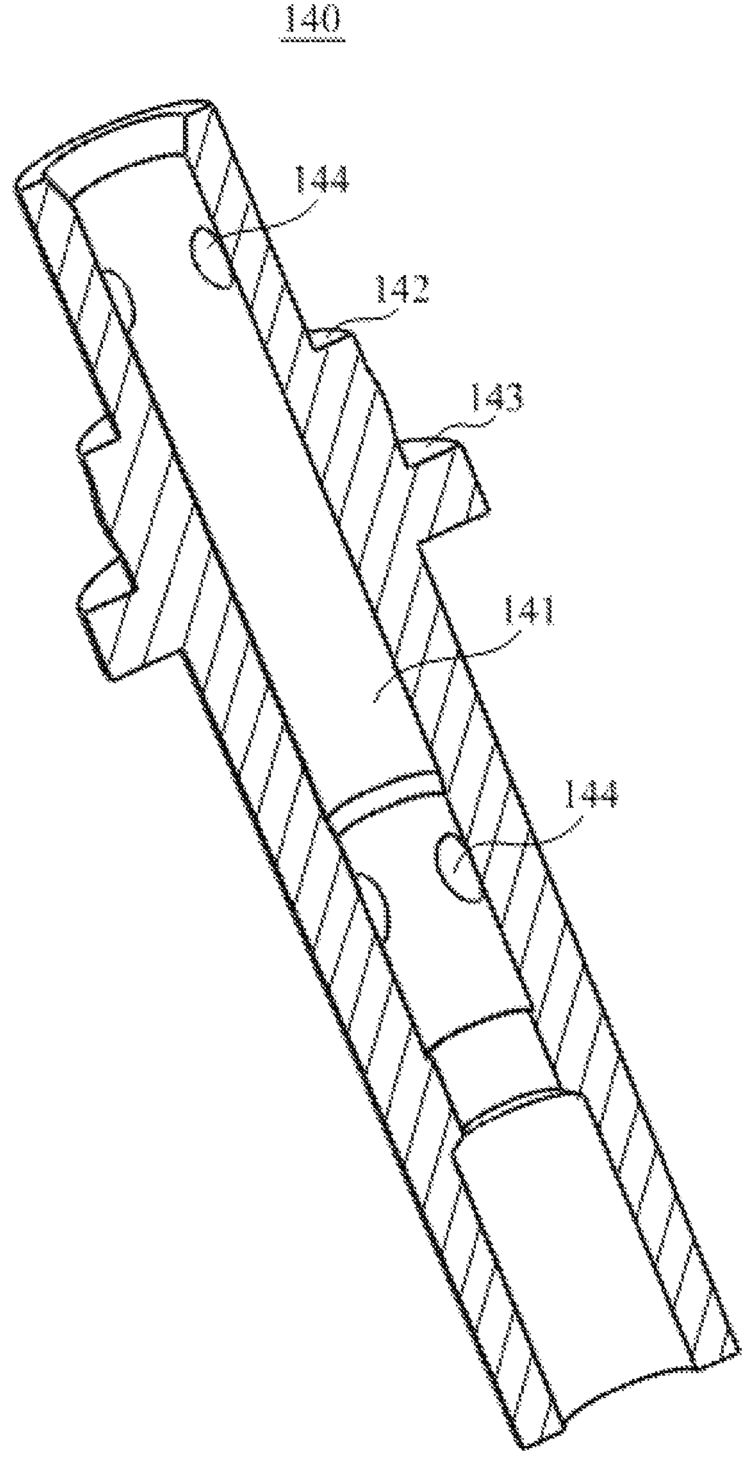
FIG. 8 is a cross-sectional view of the second connector according to an embodiment of the present invention.

Referring to FIG. 7 and FIG. 8, a second through hole 141 is formed inside the second connecting member 140, and the outer circumferential surface of the second connecting member 140 is provided with a second convex ring portion 142 and a third convex ring portion 143 along a circumferential direction thereof. One end of the second connecting member 140 is inserted into the first through hole 121, one end of the regulator 120 abuts against the second convex ring portion 142 and one end of the first connecting member 130 abuts against the third convex ring portion 143.

One end of the pen tip 200 is inserted into the second through hole 141.

As shown in FIG. 3, according to embodiments of the present invention, the ink cartridge assembly 100 has very few components which are simple in structure, low in cost and less prone to assembly errors, thereby facilitating manufacturing and assembly. The assembled structure is reliable and stable by means of connections such as plugging, pushing, positioning and the like among the ink cartridge 110, the regulator 120, the first connecting member 130, the second connecting member 140 and the pen tip 200.

The first through hole 121, the second through hole 141 and the ink duct 210 are coaxial and communication with each other, and the ink guide core 150 penetrates through the first through hole 121, the second through hole 141 and the ink duct 210. The integrated structure of the ink guide core 150 can be installed by direct insertion.

According to embodiments of the present invention, the fixation of the ink guide core 150 is improved.

Figure 9:
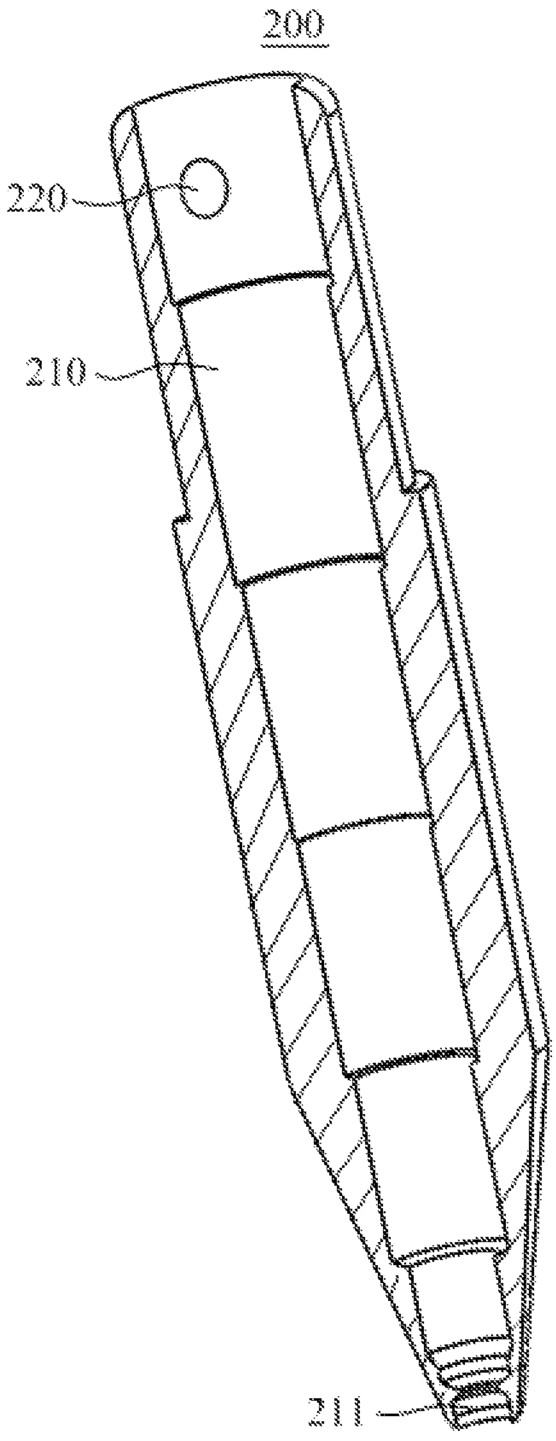
FIG. 9 is a cross-sectional view of a pen tip according to an embodiment of the present invention.

Specifically, referring to FIG. 3 and FIG. 9, one or more first protruding portions 220 are provided on an inner peripheral wall of the ink duct 210. The first protruding portions 220 are disposed close to an upper end of the pen tip 200. The first protruding portions 220 are pressed up against the ink guide core 150 to clamp and fix the ink guide core 150.

Referring to FIG. 8, one or more second protruding portions 144 are disposed in the second connecting member 140 or on the inner peripheral wall of the second through hole 141, the second protruding portions 144 abutting against the ink guide core 150 to further improve the clamping and fixing of the ink guide core 150.

According to embodiments of the present invention, the amount, arrangement and processing of the first protruding portions 220 and the second protruding portions 140 are not further limited.

For example, the first protruding portions 220 are dotted on the inner circumferential wall of the ink duct 210 after the pen tip is molded by injection, so that three first protruding portions 220 are uniformly arranged circumferentially.

With respect to the second connecting member 140, a part of the second protruding portions 144 is provided at the upper part of the second through hole 141 and arranged at intervals in the circumferential direction, and another part of the second protruding portions 144 is provided at the middle part of the second through hole 141 and arranged at intervals in the circumferential direction. The second protruding portions 144 provided at the upper part are dotted after the injection molding process of the second connecting member 140 is completed, and the second protruding portions 144 provided at the middle part are integrally molded with the second connecting member 140 by injection molding.

In some embodiments of the present invention, the first protruding portions and the second protruding portions can also be rib structures, which can also act as clamping members or fixing members for the ink guide core 150.

The upper end of the ink guide core 150 is in an interference fit with the first through hole 121, which further secures the ink guide core 150.

The interference fits between the ink guide core 150 and each one of the first protruding portions 220, the second protruding portions 144 and the first through hole 121 could secure the ink guide core 150 at three positions: upper, middle and lower, which greatly improves the stability of the ink guide core 150 and ensures that the ink guide core 150 does not move in various destructive environments. Poor contact between the ink guide core 150 and the ball member 230 is avoided, and the ink supply by the ink guide core 150 is not affected.

In some embodiments of the present invention, referring to FIG. 1 and FIG. 6, a vent 133 is opened on the first connecting member 130, which is configured to keep the internal pressure and the external pressure in equilibrium to ensure a smooth supply of ink, thereby preventing the ink from drying up or leaking. If the ventilation is too large, the ink will evaporate easily, causing the ink to dry out; if the ventilation is too small, the internal regulator will not able to ensure smooth ink supply, resulting in insufficient ink supply or an imbalance between internal and external pressure, causing ink leakage.

In some embodiments of the present invention, the vent 133 is opened on the second connecting member 140 (not shown in the Figures), which can achieve the same effect as described above.

In some embodiments of the present invention, referring to FIG. 6, the outer peripheral wall of the straight cylindrical portion 131 of the first connecting member 130 is provided with ventilation grooves 134 along its circumferential direction. The ventilation grooves 134 help to reduce volatilization of the ink and delay the drying out of the ink.

The specific structure of the ventilation grooves 134 is not limited in the embodiment. For example, the ventilation grooves 134 could be a plurality of annular grooves arranged spaced apart, and any two adjacent annular grooves are communicated through gaps. The ventilation grooves 134 could also be spiral grooves.

Embodiment 2

The difference between the second embodiment and the first embodiment is the arrangement of the ball member 230, and other structures are the same, so only the ball member 230 is described in detail below.

Figure 5:
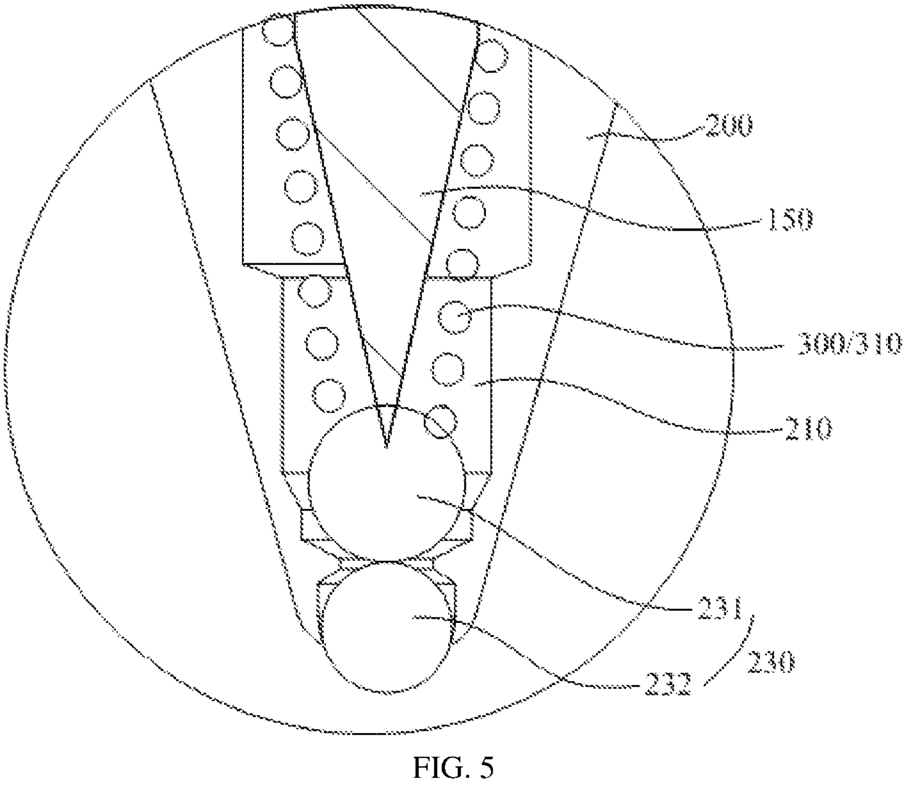
FIG. 5 is an enlarged view of a part A according to another embodiment of the present invention.

In the second embodiment, referring to FIG. 5, the ball member 230 is a double ball structure, comprising an upper ball 231 and a lower ball 232, wherein the upper ball 231 abuts against the lower ball 232, the conical spring 310 abuts against the upper ball 231, and the ink guide core 150 abuts against the upper ball 231.

The conical spring 310 acts directly on the upper ball 231 and the upper ball 231 acts directly on the lower ball 232 to form force transmission, so that a contact seal is formed between the lower ball 232 and the inner wall of the ink duct to prevent ink evaporation and ink leakage.

The conical spring 310 abuts against the upper ball 231. Regardless of whether there is a good fit between the conical spring 310 and the upper ball 231, the upper ball 231 remains in contact with the lower ball 232 along a center line, which helps to improve the sealing effect.

The friction force in the double ball structure is very low, which means that writing feels very smooth.

Embodiment 3

The present invention provides a writing pen, which comprises the knock type direct liquid pen refill assembly disclosed in the first and second embodiments.

Finally, it should be noted that: the above embodiments are used only to illustrate, but not to limit, the technical solutions of the present invention; although the present invention has been described in detail with reference to the foregoing embodiments, it should be understood by those skilled in the art that modifications may still be made to the technical solutions described in the foregoing embodiments, or that some technical features thereof may be substituted in an equivalent manner; and these modifications or substitutions do not depart from the essence of the corresponding technical solutions: although the present invention has been described in detail with reference to the foregoing embodiments, those skilled in the art should understand that: it is still possible for modifications to be made to the technical solutions described in the foregoing embodiments, or for some technical features thereof to be equivalently substituted; and these modifications or substitutions do not cause the essence of the corresponding technical solutions to depart from the spirit and scope of the technical solutions of the embodiments of the present invention.

What is claimed is:

1. A knock type direct liquid pen refill assembly comprising:

an ink cartridge assembly provided with an ink guide core therein;

a pen tip disposed at one end of the ink cartridge assembly, in which an ink duct is formed and passes therethrough, a ball member is provided at an ink outlet end of the ink duct, the ink guide core is partially inserted into the ink duct and one end of the ink guide core abuts against the ball member; and an elastic member wrapped around the outer periphery of the ink guide core and positioned inside the ink duct, and the elastic member abuts against the ball member to exert a force to push the ball member up against the inner wall of the ink outlet end;

wherein the elastic member is a conical spring and one end of the conical spring gradually tapers in diameter toward the ball member;

wherein the ball member comprises an upper ball and a lower ball, wherein the upper ball abuts against the lower ball, the conical spring abuts against the upper ball and the ink guide core abuts against the upper ball;

wherein the ink cartridge assembly comprises an ink cartridge, a regulator, a first connecting member and a second connecting member, in which the regulator is disposed in the ink cartridge, a first through hole is formed inside the regulator; the first connecting member comprises a hollow straight cylindrical portion having an outer lateral surface provided with a first convex ring portion along a circumferential direction thereof, the ink cartridge is sleeved on the outer lateral surface of the straight cylindrical portion, one end of the ink cartridge abuts against the first convex ring portion and one end of the regulator is inserted into the first connecting member;

a second through hole is formed inside the second connecting member, and the outer lateral surface of the second connecting member is provided with a second convex ring portion and a third convex ring portion along a circumferential direction thereof; one end of the second connecting member is inserted into the first through hole and one end of the regulator abuts against the second convex ring portion and one end of the first connecting member abuts against the third convex ring portion;

one end of the pen tip is inserted into the second through hole; and the first through hole, the second through hole and the ink duct are coaxial and communication with each other, and the ink guide core penetrates through the first through hole, the second through hole and the ink duct;

wherein a vent is opened on the first connecting member;

wherein the outer peripheral wall of the straight cylindrical portion of the first connecting member is provided with ventilation grooves along its circumferential direction;

wherein one or more first protruding portions are provided on an inner peripheral wall of the ink duct; the first protruding portions are pressed up against the ink guide core;

one or more second protruding portions are disposed on an inner peripheral wall of the second through hole; the second protruding portions are abutted against the ink guide core;

the upper end of the ink guide core is in an interference fit with the first through hole.

2. The knock type direct liquid pen refill assembly according to claim 1, wherein the ink guide core comprises an ink guide core upper portion and an ink guide core lower portion which are integrally formed, and the diameter of the ink guide core upper portion is larger than that of the ink guide core lower portion, and a stepped portion is formed between the ink guide core upper portion and the ink guide core lower portion, one end of the conical spring abuts against the ball member and the other end of the conical spring abuts against the stepped portion.

3. A writing pen comprising, the knock type direct liquid pen refill assembly according to claim 1.

* * * * *